US010235395B2

(12) United States Patent
Andikkad Perunthan et al.

(10) Patent No.: US 10,235,395 B2
(45) Date of Patent: *Mar. 19, 2019

(54) KEYWORD IDENTIFICATION FOR AN ENTERPRISE RESOURCE PLANNING MANAGER

(71) Applicant: International Business Machines Corporation, Armonk, NY (US)

(72) Inventors: Sadikali Andikkad Perunthan, Pune (IN); Santosh Das, Pune (IN); Ram Gour, Pune (IN); Vikas P. Manwatkar, Pune (IN)

(73) Assignee: International Business Machines Corporation, Armonk, NY (US)

( * ) Notice: Subject to any disclaimer, the term of this patent is extended or adjusted under 35 U.S.C. 154(b) by 233 days.

This patent is subject to a terminal disclaimer.

(21) Appl. No.: 15/082,477

(22) Filed: Mar. 28, 2016

(65) Prior Publication Data

US 2017/0277730 A1    Sep. 28, 2017

(51) Int. Cl.
*G06F 17/30*    (2006.01)
*G06Q 40/02*    (2012.01)

(52) U.S. Cl.
CPC .. *G06F 17/30303* (2013.01); *G06F 17/30424* (2013.01); *G06F 17/30705* (2013.01); *G06Q 40/02* (2013.01); *G06F 17/30312* (2013.01)

(58) Field of Classification Search
CPC ......... G06F 17/30867; G06F 17/30312; G06F 17/30705; G06Q 30/0625
See application file for complete search history.

(56) References Cited

U.S. PATENT DOCUMENTS

| 6,792,422 B1* | 9/2004 | Stride | G06Q 40/00 705/35 |
| 8,515,958 B2* | 8/2013 | Knight | G06F 17/30713 707/737 |
| 9,092,773 B2 | 7/2015 | Daly et al. | |
| 9,245,289 B2* | 1/2016 | Ballaro | G06Q 10/087 |

(Continued)

OTHER PUBLICATIONS

Wu et al., "Towards Keyword-Driven Analytical Processing", SIGMOD '07, Jun. 12-14, 2007, pp. 617-628.

(Continued)

*Primary Examiner* — Apu M Mofiz
*Assistant Examiner* — Sheryl L Holland
(74) *Attorney, Agent, or Firm* — Kenneth Han (57) ABSTRACT

Financial data that contains a least one financial entry relating to procurement of goods, services, materials and/or items. The financial data is cleansed to remove information contained within the at least one financial entry. The keywords are determined within the at least one financial entry of the financial data and a database that includes a plurality of databases entries is searched for a database entry that corresponds to the keywords determined in the at least one financial entry of the financial data. An identification number in the database entry that corresponds to the keywords determined in the at least one financial entry of the financial data and updating the at least one financial entry of the financial data to include the determined identification number. The updated financial procurement data is transmitted to a computing device.

15 Claims, 5 Drawing Sheets

(56) References Cited

U.S. PATENT DOCUMENTS

| | | | | |
|---|---|---|---|---|
| 9,286,283 | B1* | 3/2016 | Wilczek | G06F 17/243 |
| 2003/0088481 | A1 | 5/2003 | Elias | |
| 2006/0178889 | A1* | 8/2006 | Benson | G06Q 20/10 |
| | | | | 705/26.1 |
| 2007/0250487 | A1* | 10/2007 | Reuther | G06F 17/30705 |
| 2013/0290177 | A1* | 10/2013 | Milam | G06Q 40/00 |
| | | | | 705/40 |
| 2014/0039970 | A1* | 2/2014 | Faridy | G06Q 10/0633 |
| | | | | 705/7.27 |
| 2014/0067629 | A1 | 3/2014 | Jones et al. | |
| 2014/0067737 | A1* | 3/2014 | Kapadia | G06N 5/025 |
| | | | | 706/20 |
| 2014/0279972 | A1 | 9/2014 | Singh et al. | |
| 2015/0081499 | A1 | 3/2015 | Caldwell | |
| 2015/0142487 | A1 | 5/2015 | Webb Smith et al. | |
| 2015/0169745 | A1* | 6/2015 | Morimoto | G06Q 10/10 |
| | | | | 707/730 |
| 2016/0078367 | A1* | 3/2016 | Adjaoute | G06N 99/005 |
| | | | | 706/12 |
| 2016/0142449 | A1* | 5/2016 | Krugman | G06Q 10/107 |
| | | | | 709/219 |
| 2016/0162859 | A1* | 6/2016 | Fukuda | G06Q 20/201 |
| | | | | 705/20 |

OTHER PUBLICATIONS

Omelayenko, "Integrating Vocabularies: Discovering and Representing Vocabulary Maps", ISWC 2002, LNCS 2342, pp. 206-220, 15 pages.

Zycus, "Adopting UNSPSC From Vision to Reality", 2006, www.unspsc.org, p. 5, extracted Feb. 28, 2018, pp. 1-45.

Lee et al., "Building an operational product ontology system", Science Direct, Electronic Commerce Research Applications, vol. 5, (2006), pp. 16-28.

Ding et al., "GoldenBullet: Automated Classification of Product Data in E-commerce", Proceedings of Business Information Systems, 2002, 9 pages.

Singh et al., "Automated Cleansing for Spend Analytics", CIKM '05, Oct. 31-Nov. 5, 2005, pp. 437-445.

Shulten et al., "The E-Commerce Product Classification Challenge", Final Version v1.0, Jul. 11, 2001, Intended for IEEE Intelligent Systems Magazine, special issue on Intelligent E-business (Jul./Aug. 2001), as an addition to the Guest Editor Introduction, pp. 1-8.

Reusch et al., "Classification of Products and Services to Support Business Process Engineering and e-Commerce", IEEE International Workshop on Intelligent Data Acquisition and Advanced Computing Systems: Technology and Applications, Sep. 8-10, 2003, pp. 452-457.

Mell et al., "The NIST Definition of Cloud Computing," National Institute of Standards and Technology, Special Publication 800-145, Sep. 2011, pp. 1-7.

IBM: List of IBM Patents or Patent Applications Treated As Related (Appendix P), Aug. 16, 2017, pp. 1-2.

U.S. Appl. No. 15/664,508, filed Jul. 31, 2017, entitled: "Keyword Identification for an Enterprise Resource Planning Manager", pp. 1-29.

Hernandez et al., "Real-world Data is Dirty: Data Cleansing and The Merge/Purge Problem", Data Mining and Knowledge Discovery, vol. 2, pp. 9-37, (1998).

Raman et al., "An Interactive Framework for Data Cleaning", Report No. UCB/CSD-0-1110, Computer Science Division (EECS), University of California, Sep. 2000, pp. 1-26.

* cited by examiner

KEYWORD IDENTIFICATION FOR AN ENTERPRISE RESOURCE PLANNING MANAGER

BACKGROUND

The present invention relates generally to the field of financial data processing, and more particularly to the classification of financial entries.

When an organization or business spans across multiple locations, the organization or business may have multiple procurement departments to buy raw materials, goods or items needed for each of their respective service locations. Enterprise resource planning (ERP) program tracks the procurement department financial transactions, expenses and other financial data associated with the procurement departments. Spend analysis allows for an organization to analyze the financial data contained within the ERP program. However, with the multiple procurement departments entering financial data into the ERP the same terminology is often not used by all of the departments and an identification number for the goods may not be used.

BRIEF SUMMARY

Additional aspects and/or advantages will be set forth in part in the description which follows and, in part, will be apparent from the description, or may be learned by practice of the invention.

Embodiments of the present invention disclose a method, computer program product, and system for classifying the financial entries in financial data. Financial data contains a least one financial entry relating to procurement of goods, services, materials and/or items. The financial data is cleansed to remove information contained within the at least one financial entry. The keywords are determined within the at least one financial entry of the financial data and a database that includes a plurality of databases entries is searched for a database entry that corresponds to the keywords determined in the at least one financial entry of the financial data. An identification number in the database entry that corresponds to the keywords determined in the at least one financial entry of the financial data and updating the at least one financial entry of the financial data to include the determined identification number. The updated financial procurement data is transmitted to a computing device.

BRIEF DESCRIPTION OF THE DRAWINGS

The above and other aspects, features, and advantages of certain exemplary embodiments of the present invention will be more apparent from the following description taken in conjunction with the accompanying drawings, in which.

DETAILED DESCRIPTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Reference will now be made in detail to exemplary embodiments of the present invention, examples of which are illustrated in the accompanying drawings, wherein like reference numerals refer to like elements throughout.

Many organizations or businesses vary in size and the number of locations that they work out of, where each location could have their own procurement department, or multiple locations could share a procurement department. Thus, the organization or business may have multiple procurement departments that generate financial data about the procurement of goods, services, materials, etc. The procurement departments use tracking programs, such as, an enterprise resource planning program, to track a procurement departments financial transactions, expenses and other financial data.

Embodiments of the invention are generally directed to a system for classifying financial entries for a business or organization. The classification system receives financial data from one or more departments and removes unnecessary information contained within the financial entries (i.e., "cleanse" the financial entries). One or more keywords are identified for each of the cleansed entries, and a database is searched using the keywords. The database is comprised of a list of commodity identification numbers that are associated with one or more keywords. The classification system identifies a commodity identification number associated with the keywords in the cleansed financial entries. The classification system updates the original financial entries to include the commodity identification number associated with the keywords in the cleansed financial entries.

Figure 1:
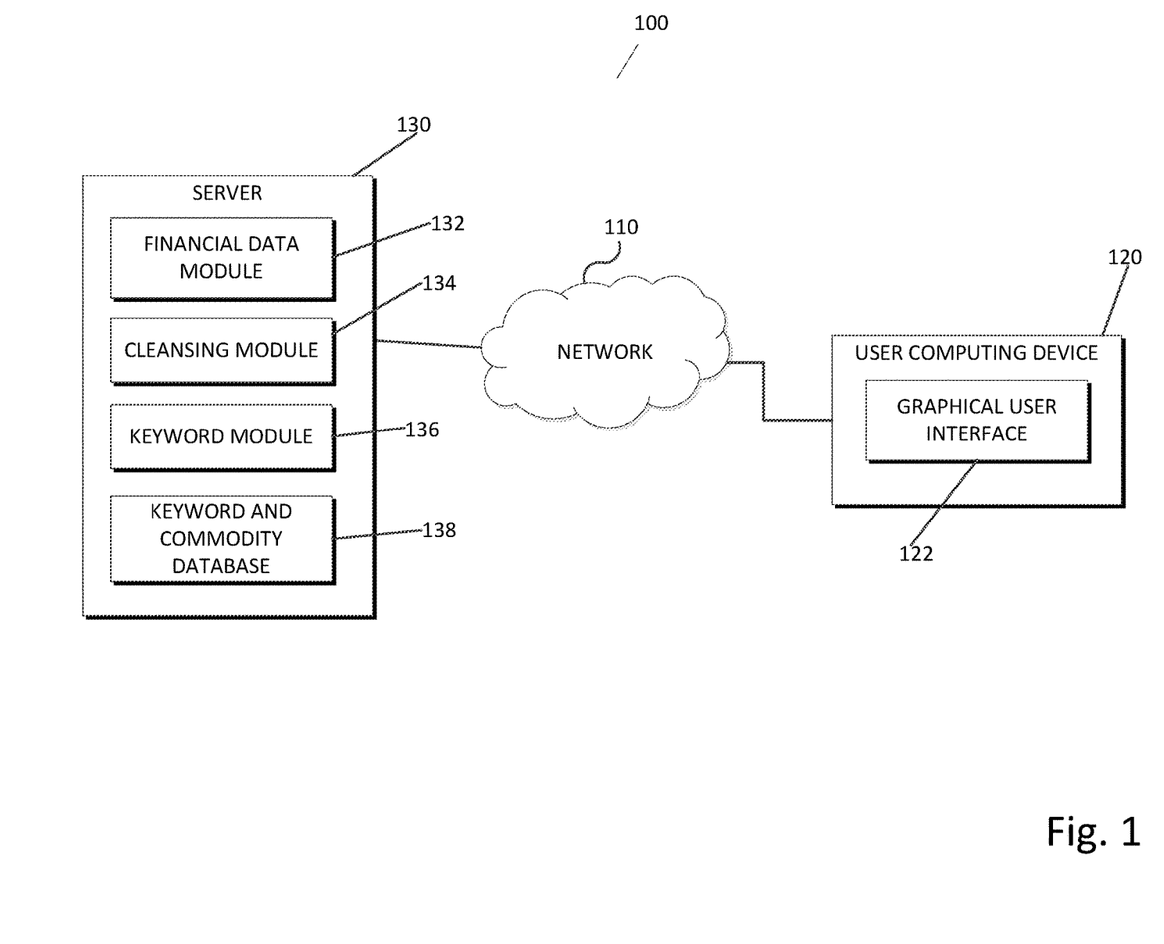
FIG. 1 is a functional block diagram illustrating a data classification system, in accordance with an embodiment of the present invention.

FIG. 1 is a functional block diagram illustrating a data classification system 100, in accordance with an embodiment of the present invention.

The data classification system 100 represents a computing environment for an organization and/or a business that generates procurement data. The data classification system 100 includes a user computing device 120 and a server 130 that communicate via network 110.

Network 110 can be, for example, a local area network (LAN), a wide area network (WAN) such as the Internet, or a combination of the two, and can include wired, wireless, or fiber optic connections. In general, network 110 can be any combination of connections and protocols that will support communications between the user computing device 120 and the server 130, in accordance with one or more embodiments of the invention.

The user computing device 120 represents a computing device that includes a user interface, for example, a graphical user interface (GUI) 122 that allows the user to upload financial data to server 130. GUI 122 represents one or more user interfaces for sending and receiving information from the server 130. GUI 122 may be, for example, a web browser, an application, or other types of GUIs for communication between the user computing device 120, and the server 130 via the network 110.

The user computing device 120 may be any type of computing devices that are capable of connecting to network 110, for example, a laptop computer, tablet computer, netbook computer, personal computer (PC), a desktop computer, a smart phone, or any programmable electronic device supporting the functionality required by one or more embodiments of the invention. The user computing device 120 may include internal and external hardware components, as described in further detail below with respect to FIG. 3. In other embodiments, the user computing device 120 may operate in a cloud computing environment, as described in further detail below with respect to FIGS. 4 and 5.

The server 130 represents a platform that hosts an application for the classification of financial entries. The server 130 can classify the financial entries using a plurality of modules including, a financial data module 132 (for receiving financial data having financial entries), a cleansing module 134 (for removing unnecessary information from the financial entries), a keyword module 136 (for identifying keywords in cleansed financial entries), and a keyword and commodity database 138 (for identifying commodity identification numbers associated with the identified keywords in the cleansed financial entries). The server 130 may include internal and external hardware components, as described in further detail below with respect to FIG. 3. In other embodiments, the server 130 may operate in a cloud computing environment, as described in further detail below with respect to FIGS. 4 and 5.

The financial data module 132 may receive financial data from the user computing device 120 via network 110. The financial data can include one or more financial entries. The financial entry may be any type of financial entry that a procurement department might enter, for example, the financial entry may include information about the purchase of goods, services, materials or any other item that a procurement department might purchase. Each financial entry may include a name of good, service, name of the provider, the cost, a commodity identification number or any other information that the procurement department might include within the financial entry.

Cleansing module 134 receives the financial entries from financial data module 132 to create one or more cleansed versions of the financial entries by removing unnecessary information. The unnecessary information may be information that is not needed to identify keywords and/or to classify what commodity, product, service, or material that the financial entry corresponds to. The unnecessary information may include, for example, numbers, special characters, abbreviations and/or stop words in each of the financial entries in the financial data. The number cleansed versions created by cleansing module 134 is dependent on the information contained in the financial entries. Each cleansed version of the financial entries may have the same or different phrase or combination of phrases removed from the original financial entry. For example, one cleansed financial entry can have numbers removed, another cleansed financial entry can have special characters removed, another cleansed financial entry can have abbreviations removed, and while another cleansed financial entry can have both the numbers and the special characters removed. Cleansing module 134 can identify the abbreviations and/or stop words that are to be removed from the financial entry by comparing the terms within the financial entry with an updated predetermined database (not shown) that contains a list of abbreviations and stop words to be removed. If the financial entries do not contain any unnecessary information, the cleansed version of the financial entry may be the same as the original financial entry received by the cleansing module 134.

The cleansing module 134 may remove numbers from the financial entry, for example, numeric characters 0 to 9, to create a cleansed financial entry. For example, the original financial entry is "Toner HP #9500, Yellow Qty 12". After the cleansing module 134 removes the numbers, the cleansed financial entry will be "Toner HP #, Yellow Qty." The cleansing module 134 may remove special characters from the original financial entry, for example, the special character may be consider to be all characters other than alphabet characters and numeric characters present in the entries in the financial data, to create a cleansed financial entry. For example, the original financial entry is "Toner HP #9500, Yellow Qty 12," and after the cleansing module 134 removes the special characters, the cleansed financial entry will be "Toner HP 9500 Yellow Qty 12." The cleansing module 134 may remove abbreviations present in the original financial entries to create a cleansed financial entry. For example, the original financial entry is "IBM India Pvt Ltd," and after the cleansing module 134 removes the abbreviations, the cleansed financial entry will be "IBM India." The cleansing module 134 may remove stop words present in the original financial entries to create a cleansed financial entry. For example, the database includes the stop words like, red, yellow, Jan, Feb or any other word determined to be a stop word. The original financial entry is "Toner HP #9500, Yellow Qty 12," and after the cleansing module 134 removes the stop words, i.e. the word yellow from the financial entry, the cleansed financial entry will be "Toner HP #9500, Qty 12." The cleansing module 134 may further remove both special characters and numeric characters to create the cleansed financial entry. For example, the original financial entry is "Toner HP #9500, Yellow Qty 12," and after the cleansing module 134 removes both special characters and numeric characters, the cleansed financial entry will be "Toner HP Qty." Once the cleansing module 134 generates the cleansed financial entries, the cleansing module 134 sends the cleansed financial entries to the keyword module 136.

The keyword module 136 receives each of the cleansed financial entries from the cleansing module 134 to identify one or more keywords in each of the cleansed financial entries. The keyword module 136 parses each of the cleansed financial entries to identify the one or more keywords contained within each of the cleansed financial entries. The keyword module 136 determines the keywords in each of the cleansed financial entries and enters them into a set of tables. The keyword module 136 creates different tables and inserts the keywords into the tables, for example, comprising Keywords AND Not Keywords (KANK), Keywords AND (KAN), Keywords NOT (KN) and Keywords (K). The keyword module 136 uses Structured Query Language to search the keyword and commodity database 138.

The keyword and commodity database 138 is a data store that stores tables of keywords and a corresponding (i.e., associated) commodity identification number. The keyword and commodity database 138, contains at least five columns; 'Commodity_Id', 'Commodity_Name', 'Keywords', 'AND_Keywords' and 'Not_Keywords'. The keyword and commodity database 138 is not limited to these columns, but can contain other columns.

The KANK table contains alphanumeric values in Keywords, AND_Keywords and Not_Keywords column, but no blank in any of the fields. The KAN table contains alphanumeric values in Keywords, and AND_Keywords column, but no value in Not_Keywords. The KN table contains alphanumeric values in Keywords and Not_Keywords column, but no value in AND_Keywords column. The K table contains alphanumeric values in Keywords column, but no value in AND_Keywords and Not_Keywords column. Table 1 below illustrates sample financial data and Table 2 below illustrates the tables generated by the keyword module 136.

The keyword module 136 determines where the cleansed financial entries correspond to one of the entries in the keyword and commodity database 138. The keyword module 136 is able to identify a commodity identification number associated with the entry in the keyword and commodity database 138. The commodity identification number can be, for example, the United Nations Standard Products and Services Code (UNSPSC) or it can by any custom created identification number and taxonomy database. UNSPSC is a four-level hierarchy coded as an eight-digit number that is used to identify a taxonomy of products and services for use in eCommerce. The keyword module 136 forwards the correct commodity identification number to the financial data module 132 to update each of the financial entries in the financial data if it is needed.

TABLE 1

Sample Financial data
Description

Office Equipment
Mt-computer hardware
Supplies-Uniforms
SubContr-Waste
Treatment

TABLE 2

| Keyword table | | | | |
|---|---|---|---|---|
| Commodity ID | Commodity Name | Keywords | AND_ Keywords | Not_ Keywords |
| 44000000_G | Office Equipment and Accessories and Supplies-General | OFFICE; | EQUIP; | SUPPL; |
| 43210000_G | Computer Equipment and Accessories-General | COMPUTER; | HARDWARE; | |

TABLE 2-continued

| Keyword table | | | | |
|---|---|---|---|---|
| Commodity ID | Commodity Name | Keywords | AND_ Keywords | Not_ Keywords |
| 53102700_G | Uniforms-General | UNIFORM; | | RENTAL; |
| 11140000_G | Scrap and waste materials-General | WASTE; | | |

The financial data module 132 may update, add or do nothing to a commodity identification number associated with a financial entry. After a financial entry has been classified, i.e. the commodity identification number has been determined for the financial entry, the financial data module 132 updates the financial entry to contain the determined commodity identification number. If the financial entry did not have a commodity identification number when it was received, then the financial data module 132 adds commodity identification number to the financial entry. If the financial entry did have a commodity identification number and the financial data module 132 determines that original received commodity identification number is the same as the determined commodity identification number, then the financial data module 132 does nothing. If the financial entry did have a commodity identification number and the financial data module 132 determines that original received commodity identification number is different than the determined commodity identification number, then the financial data module 132 replaces the original received commodity identification number with the determined commodity identification number.

The financial data module 132 sends out the updated financial data to the user computing device 120. How the correct commodity identification number is identified will be explained in further detail below.

Figure 2:
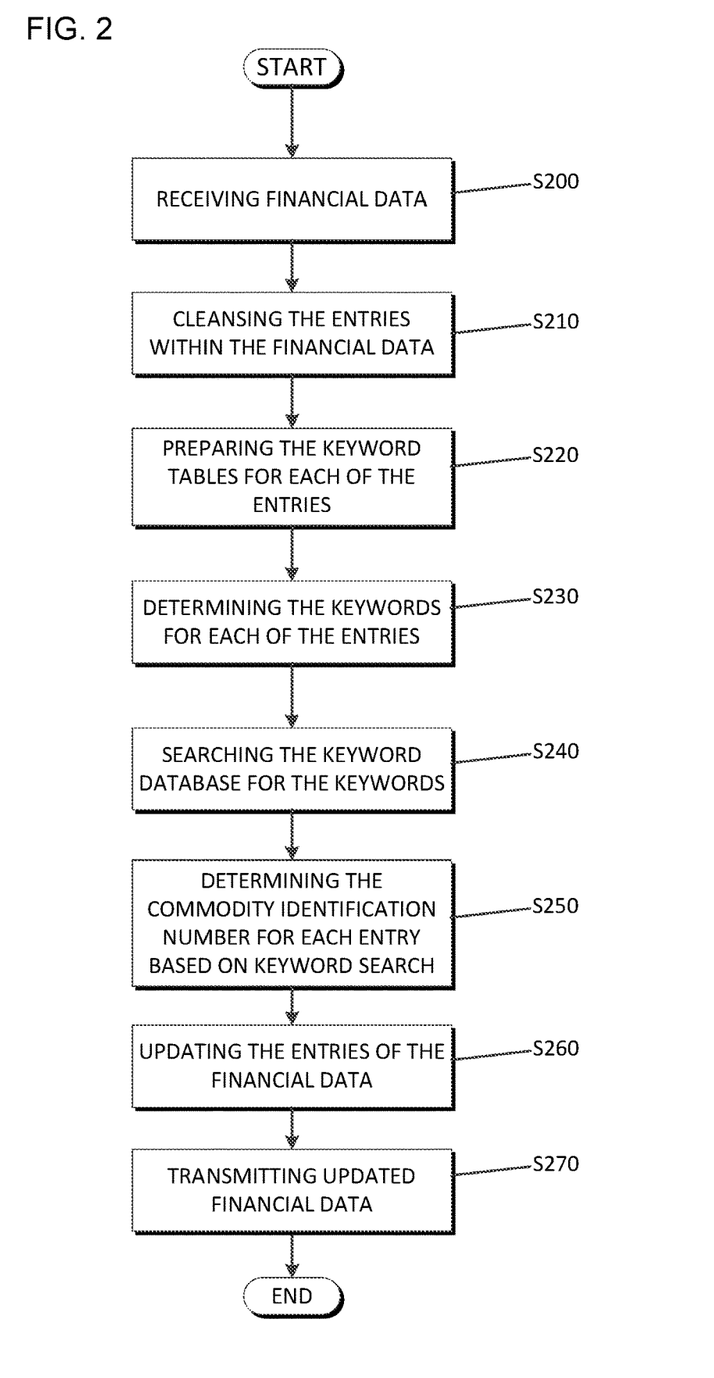
FIG. 2 is a flowchart depicting operational steps of the classification program within the data classification system of FIG. 1, in accordance with an embodiment of the present invention.

FIG. 2 is a flowchart depicting operational steps of the classification program within the data classification system of FIG. 1, in accordance with an embodiment of the present invention.

The financial data module 132 receives the financial data, which contains at least one financial entry (S200) and the cleansing module 134 cleanses the financial entries of unnecessary financial data (S210). The keyword module 136 prepares the keyword table for the cleansed financial data (S220) and the keyword module 136 determines the keywords for each of the cleansed entries (S230). The keyword module 136 enters the keywords from the entries into the tables and searches the keyword and commodity database 138 to find a corresponding financial entry (S240). The keyword module 136 determines the commodity number for the cleansed financial entry by finding corresponding financial entry in the keyword and commodity database (S250). The financial data module 132 updates each financial entry to include the commodity identification number found in the keyword and commodity database 138 (S260). The financial data module 132 transmits the updated financial data back to the user computing device 120 that uploaded the financial data or to another user computing device (S270).

Figure 3:
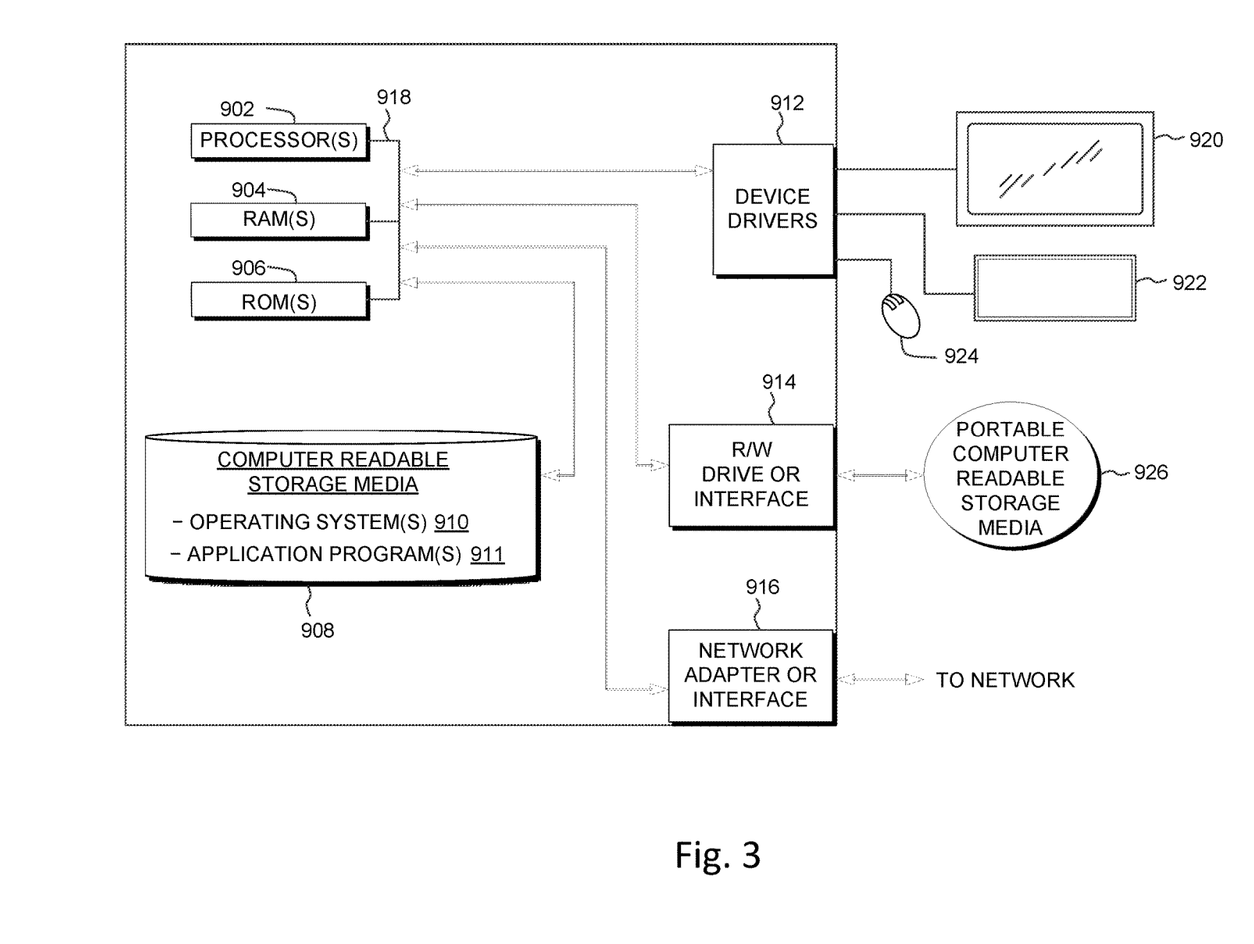
FIG. 3 is a block diagram of components of a computing device of the data classification system of FIG. 1, in accordance with embodiments of the present invention.

FIG. 3 depicts a block diagram of components of user computing device 120 and/or the server 130 of a data classification system 100 of FIG. 1, in accordance with an embodiment of the present invention. It should be appreciated that FIG. 3 provides only an illustration of one implementation and does not imply any limitations with regard to the environments in which different embodiments may be implemented. Many modifications to the depicted environment may be made.

User computing devices 120 and/or server 130 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, for example, the data classification program including the financial data module 132, the cleansing module 134, the keyword module 136, and the keyword and commodity database 138 (FIG. 1), are stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

User computing devices 120 and/or server 130 may also include a R/W drive or interface 914 to read from and write to one or more portable computer readable storage media 926. Application programs 911 on the user computing devices 120 and/or server 130 may be stored on one or more of the portable computer readable storage media 926, read via the respective R/W drive or interface 914 and loaded into the respective computer readable storage media 908.

User computing devices 120 and/or server 130 may also include a network adapter or interface 916, such as a TCP/IP adapter card or wireless communication adapter (such as a 4G wireless communication adapter using OFDMA technology). Application programs 911 on the user computing devices 120 and/or server 130 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

User computing devices 120 and/or server 130 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
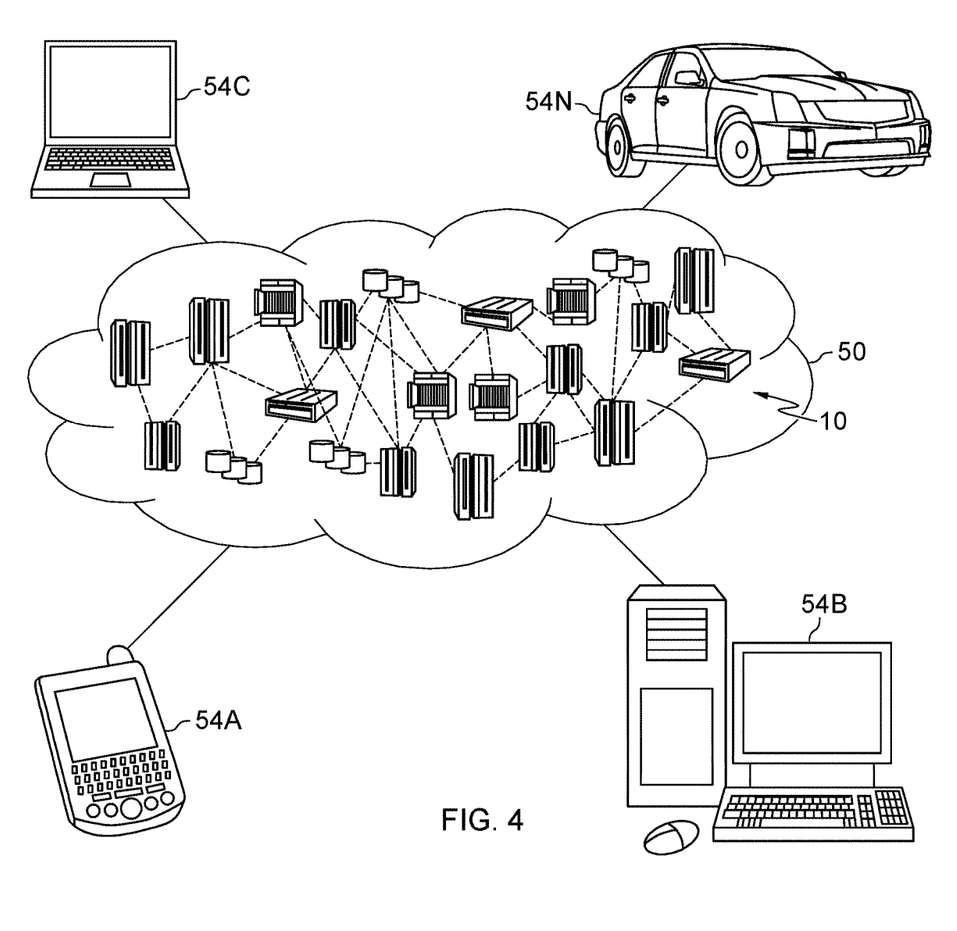
FIG. 4 depicts a cloud computing environment according to an embodiment of the present invention.

Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
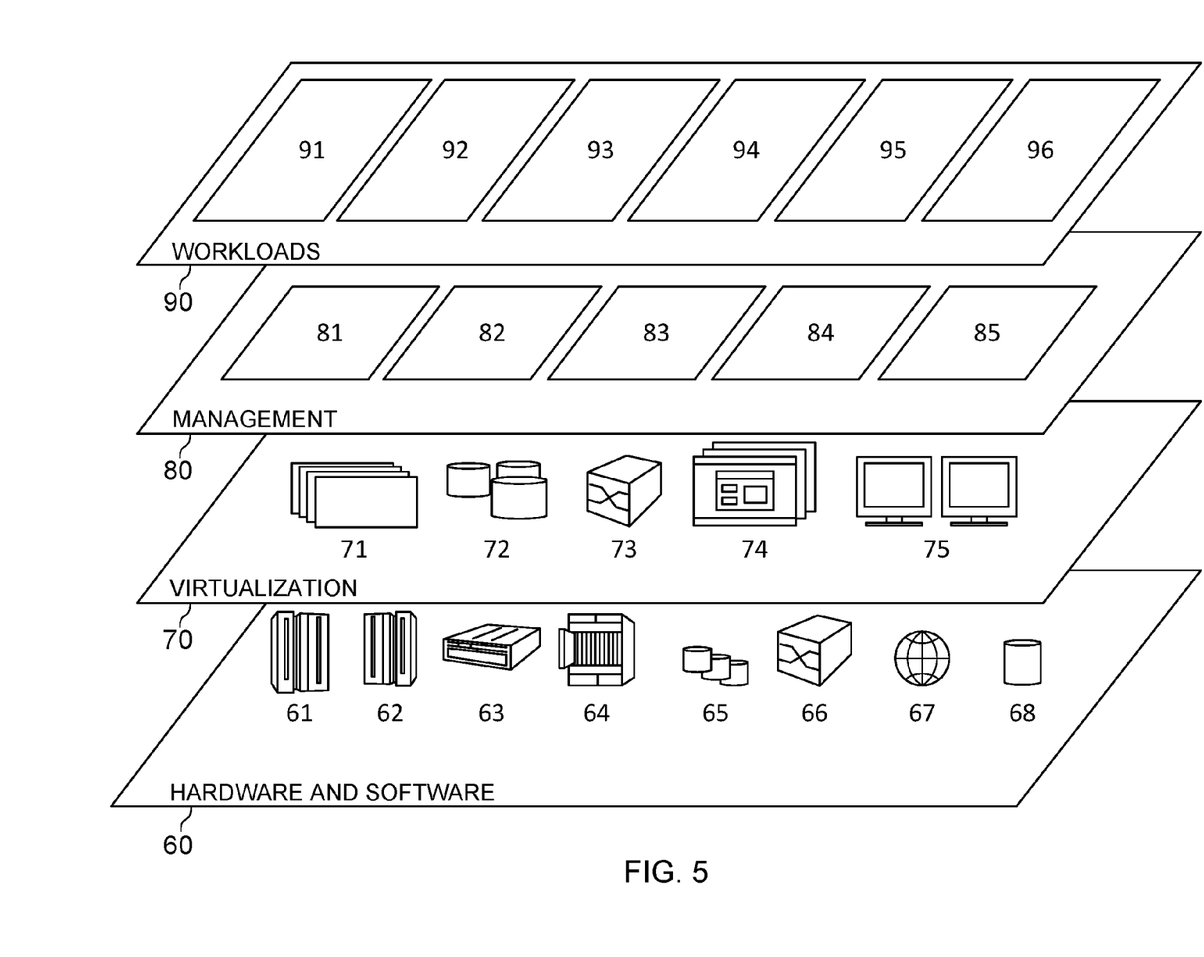
FIG. 5 depicts abstraction model layers according to an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a data classification system 96.

Based on the foregoing, a computer system, method, and computer program product have been disclosed. However, numerous modifications and substitutions can be made without deviating from the scope of the present invention. Therefore, the present invention has been disclosed by way of example and not limitation.

While the invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A method comprising:
    receiving, by a computer, financial data from a computing device, wherein the financial data includes at least one financial entry that includes a name of a service, a name of a service provider, a cost of the service, and a commodity identification number of the service;
    creating a cleansed financial entry, by the computer, for each datum from the at least one financial entry except any unnecessary information contained within the at least one financial entry, wherein the unnecessary information comprises numeric characters, special characters other than alphabetic characters, abbreviations, and stop words;
    identifying, by the computer, keywords in the at least one cleansed financial entry;
    creating a plurality of tables that include columns labeled as Keywords AND Not Keywords, Keywords AND, Keywords NOT, and Keywords;
    inserting the identified keywords into the prepared tables;
    searching, by the computer, a database for a database entry that corresponds to the identified keywords in the created tables, wherein the database has five columns, wherein one column is labeled Commodity Id, one column is labeled Commodity Name, one column is labeled Keywords, one column is labeled AND Keywords, and one column is labeled Not Keywords;

determining, by the computer, a commodity identification number in the database entry that corresponds to the identified keywords in the created tables;

updating, by the computer, the at least one financial entry to include the determined commodity identification number; and transmitting, by the computer, updated financial data to the computing device, wherein the updated financial data includes the at least one updated financial entry.

2. The method of claim 1, wherein the commodity identification number is comprised of the United Nations Standard Products and Services Code (UNSPSC).

3. The method of claim 1, wherein the abbreviations and stop words to be removed from the at least one financial entry are identified by comparing terms within the at least one financial entry with an updated predetermined database that contains a list of abbreviations and stop words to be removed.

4. The method of claim 1, wherein the commodity identification number is a custom created identification number and taxonomy database.

5. The method of claim 1, wherein updating the at least one financial entry further comprises:

in response to the commodity identification number associated with the at least one received financial entry being different than the determined commodity identification number, replacing the commodity identification number associated with the at least one received financial entry with the determined commodity identification number.

6. A computer program product comprising:

one or more non-transitory computer-readable storage media and program instructions stored on the one or more non-transitory computer-readable storage media, the program instructions comprising:

receiving, by a computer, financial data from a computing device, wherein the financial data includes at least one financial entry that includes a name of a service, a name of a service provider, a cost of the service, and a commodity identification number of the service to procurement of goods, services, materials and/or items;

creating a cleansed financial entry cleansing, by the computer, for each datum from the at least one financial entry except any unnecessary information contained within the at least one financial entry, wherein the unnecessary information comprises numeric characters, special characters other than alphabetic characters, abbreviations, and stop words;

identifying, by the computer, keywords in the at least one cleansed financial entry;

creating a plurality of tables that include columns labeled as Keywords AND Not Keywords, Keywords AND, Keywords NOT, and Keywords;

inserting the identified keywords into the prepared tables;

searching, by the computer, a database for a database entry that corresponds to the identified keywords in the created tables of the at least one cleansed financial entry, wherein the database has five columns, wherein one column is labeled Commodity Id, one column is labeled Commodity Name, one column is labeled Keywords, one column is labeled AND Keywords, and one column is labeled Not Keywords;

determining, by the computer, a commodity identification number in the database entry that corresponds to the identified keywords in the created tables at least one cleansed financial entry;

updating, by the computer, the at least one financial entry to include the determined commodity identification number; and transmitting, by the computer, updated financial data to the computing device, wherein the updated financial data includes the at least one updated financial entry.

7. The computer program product of claim 6, wherein the commodity identification number is comprised of the United Nations Standard Products and Services Code (UNSPSC).

8. The computer program product of claim 6, wherein the abbreviations and stop words to be removed from the at least one financial entry are identified by comparing terms within the at least one financial entry with an updated predetermined database that contains a list of abbreviations and stop words to be removed.

9. The computer program product of claim 6, wherein the commodity identification number is a custom created identification number and taxonomy database.

10. The computer program product of claim 6, wherein updating the at least one financial entry further comprises:

in response to the commodity identification number associated with the at least one received financial entry being different than the determined commodity identification number, replacing the commodity identification number associated with the at least one received financial entry with the determined commodity identification number.

11. A computer system comprising:

one or more non-transitory computer-readable storage media and program instructions stored on the one or more non-transitory computer-readable storage media, the program instructions comprising:

receiving, by a computer, financial data from a computing device, wherein the financial data includes at least one financial entry that includes a name of a service, a name of a service provider, a cost of the service, and a commodity identification number of the service to procurement of goods, services, materials and/or items;

creating a cleansed financial entry cleansing, by the computer, for each datum from the at least one financial entry except any unnecessary information contained within the at least one financial entry, wherein the unnecessary information comprises numeric characters, special characters other than alphabetic characters, abbreviations, and stop words;

identifying, by the computer, keywords in the at least one cleansed financial entry;

creating a plurality of tables that include columns labeled as Keywords AND Not Keywords, Keywords AND, Keywords NOT, and Keywords;

inserting the identified keywords into the prepared tables;

searching, by the computer, a database for a database entry that corresponds to the identified keywords in the created tables of the at least one cleansed financial entry, wherein the database has five columns, wherein one column is labeled Commodity Id, one column is labeled Commodity Name, one column is labeled Keywords, one column is labeled AND Keywords, and one column is labeled Not Keywords;

determining, by the computer, a commodity identification number in the database entry that corresponds to the identified keywords in the created tables at least one cleansed financial entry;

updating, by the computer, the at least one financial entry to include the determined commodity identification number; and transmitting, by the computer, updated financial data to the computing device, wherein the updated financial data includes the at least one updated financial entry.

12. The computer system of claim 11, wherein the commodity identification number is comprised of the United Nations Standard Products and Services Code (UNSPSC).

13. The computer system of claim 11, wherein the abbreviations and stop words to be removed from the at least one financial entry are identified by comparing terms within the at least one financial entry with an updated predetermined database that contains a list of abbreviations and stop words to be removed.

14. The computer system of claim 11, wherein the commodity identification number is a custom created identification number and taxonomy database.

15. The computer system of claim 11, wherein updating the at least one financial entry further comprises:

in response to the commodity identification number associated with the at least one received financial entry being different than the determined commodity identification number, replacing the commodity identification number associated with the at least one received financial entry with the determined commodity identification number.

* * * * *